Sheet 1, 2 Sheets.

J. E. Granniss.

Bullet Mach.

Nº 93,613. Patented Aug. 10, 1869.

Witnesses
Jeo. D. Walker
Geo. S. Pinckney

Inventor
Jno. E. Granniss

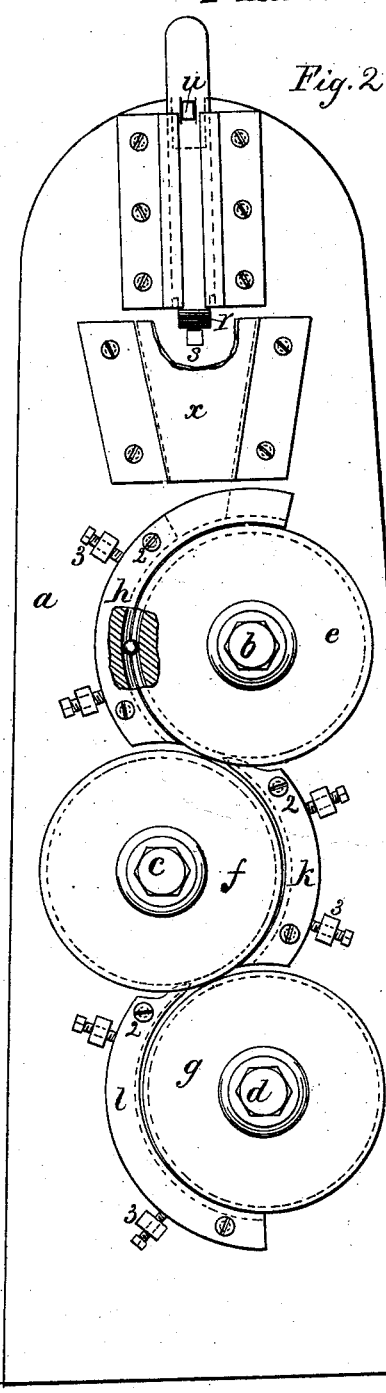

United States Patent Office.

JAMES E. GRANNISS, OF NEW YORK, N. Y.

Letters Patent No. 93,613, dated August 10, 1869.

IMPROVED MACHINE FOR MAKING BULLETS.

The Schedule referred to in these Letters Patent and making part of the same.

*To all whom it may concern:*

Be it known that I, JAMES E. GRANNISS, of the city and State of New York, have invented, made, and applied to use, a new and useful Improvement in Bullet-Machines; and I do hereby declare the following to be a full, clear, and exact description of the said invention, reference being had to the annexed drawing, making part of this specification, wherein—

Figure 2 is a front view of the same, with one of the wheels in section transversely of its axis.

Similar marks of reference denote the same parts.

Figure 1:
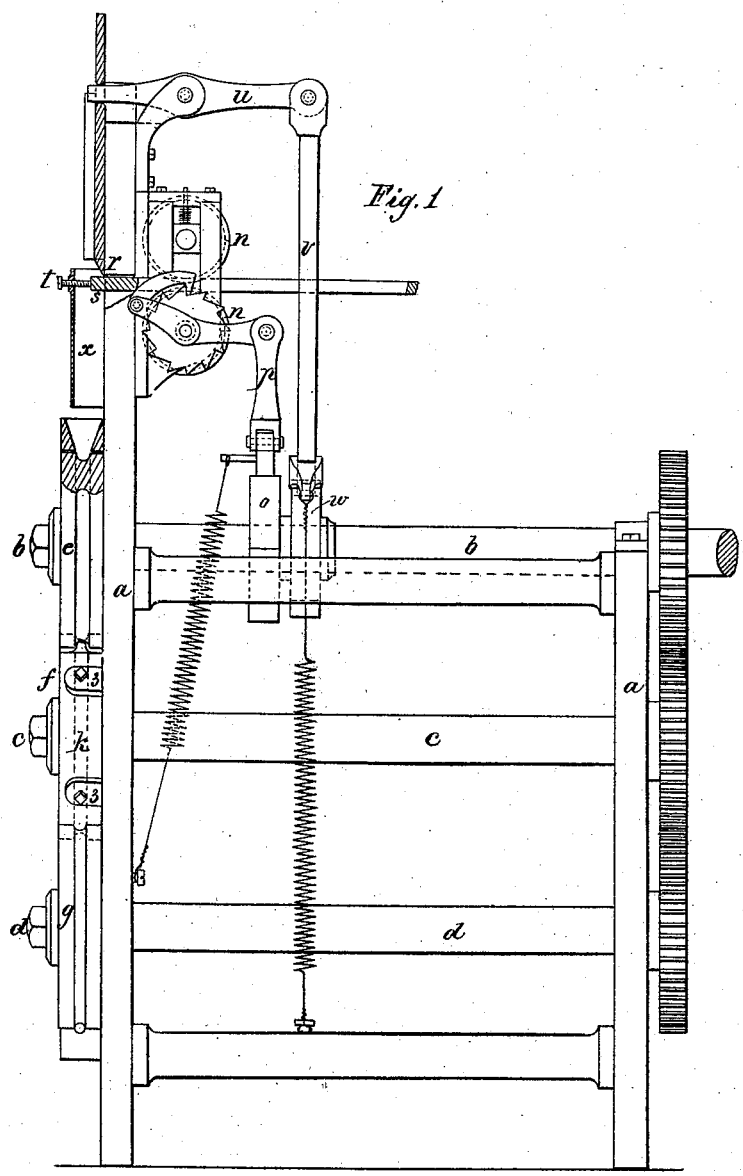
Figure 1 is a side elevation of the machine for making bullets, the upper of the compressing-wheels and segments being in section.

This machine is for the purpose of compressing, into a globular form, a square or cylindrical slug of lead, that is cut off from a bar or rod of metal.

My invention relates to a series of grooved rollers, combined with converging grooved segmental dies, the same being so arranged that the cube or cylinder of lead is reduced, by successive stages, to a globular form, with a smooth surface.

This construction of machine allows for the use of roughened grooves, to act, in the first instance, in reducing the angles, and giving a globular form, thereafter to be finished and smoothed in the subsequent operations.

In the drawing—

$a$ represents the frames of the machine, sustaining the shafts $b\ c\ d$, that are geared together, and driven by competent power.

Upon the projecting ends of the shafts $b\ c\ d$ are the grooved rollers $e\ f\ g$, the upper one of which, $e$, is made with a semicircular groove in its periphery, that has a roughened surface; the second roller, $f$, has a similarly-shaped grooved periphery, but smoother; and the semicircular groove in the periphery of the roller $g$ is to be smooth.

The grooved segmental dies $h\ k\ l$ are each formed with semicircular grooves in their inner faces, the groove in $l$ being smooth, or nearly so, and that in $h$ sufficiently roughened to act with the roller $e$.

These dies $h\ k\ l$ are attached by screws, 2 2, and adjusted by screws, 3 3, so that the lower ends are nearer to the rollers than the upper ends, so that the grooves slightly converge, in order to compress the slugs gradually into a globular form.

I provide clearing-points, projecting into the grooves of $e$ and $f$, respectively, that prevent balls that may adhere in the groove being carried over the second time, and cause them to pass into the groove below.

The bar or strip of lead is supplied by means of rollers $n\ n$, that are pressed together by means of springs, so as to grip the metal, but not compress it, and, if desired, several pairs of rollers may be connected together, so as to insure the proper feed of the bar or strip.

I employ a cam, $o$, connecting-rod $p$, and ratchet-wheel, to partially rotate the rollers, and feed forward the bar through between the cutting-surfaces $r\ s$; and a stop, $t$, that is adjustable, determines the size of the slug that is cut off.

The cutter $r$ is actuated by a lever, $u$, and rod, $v$, that is operated by the cam $w$.

The parts are so formed and placed that the feeding of the bar is between the strokes of the cutter $r$, and $x$ is a hopper, to guide the cubical, prismatic, or cylindrical slugs into the grooves of the roller $e$ and die, to be operated upon in the before-mentioned manner, and formed into a globular shape.

What I claim, and desire to secure by Letters Patent, is—

The arrangement of the rollers, $e, f$, and $g$, and adjustable segmental grooved dies, $h, k$, and $l$, in the manner specified, so as to reduce the slug by successive stages into a globular form, substantially as set forth.

In witness whereof, I have hereunto set my signature, this 20th day of April, 1869.

JAS. E. GRANNISS.

Witnesses:
GEO. D. WALKER,
GEO. T. PINCKNEY.